(12) United States Patent
Yang

(10) Patent No.: US 11,674,725 B2
(45) Date of Patent: Jun. 13, 2023

(54) HEAT PUMP

(71) Applicant: Ji Yang, Hunan (CN)

(72) Inventor: Ji Yang, Hunan (CN)

( * ) Notice: Subject to any disclaimer, the term of this patent is extended or adjusted under 35 U.S.C. 154(b) by 403 days.

(21) Appl. No.: 16/767,125

(22) PCT Filed: Dec. 28, 2018

(86) PCT No.: PCT/CN2018/124818
§ 371 (c)(1),
(2) Date: May 27, 2020

(87) PCT Pub. No.: WO2019/129195
PCT Pub. Date: Jul. 4, 2019

(65) Prior Publication Data
US 2020/0370761 A1    Nov. 26, 2020

(30) Foreign Application Priority Data
Dec. 29, 2017   (CN) .......................... 201711469300.4

(51) Int. Cl.
*F25B 47/02*       (2006.01)
*F24D 3/18*        (2006.01)
(Continued)

(52) U.S. Cl.
CPC ............... *F25B 47/02* (2013.01); *F24D 3/18* (2013.01); *F24H 4/02* (2013.01); *F25B 13/00* (2013.01); *F25B 30/02* (2013.01); *F25B 41/22* (2021.01)

(58) Field of Classification Search
CPC .......... F25B 47/02; F25B 13/00; F25B 41/22; F25B 49/02; F25B 2313/002;
(Continued)

(56) References Cited

U.S. PATENT DOCUMENTS 4,122,688 A * 10/1978 Mochizuki ................ F25B 5/02
                                                           62/278
5,554,230 A *  9/1996 Huber ....................... C21D 1/76
                                                           148/206
(Continued)

FOREIGN PATENT DOCUMENTS

CN           1800749        7/2006
CN         101581515       11/2009
(Continued)

OTHER PUBLICATIONS

"International Search Report (Form PCT/ISA/210) of PCT/CN2018/124818," dated Mar. 6, 2019, with English translation thereof, pp. 1-5.

*Primary Examiner* — Kun Kai Ma
(74) *Attorney, Agent, or Firm* — JCIPRNET

(57) ABSTRACT

A device for heating by absorbing latent heat of solidification of water, including a compressor (1), a condenser (2) and multiple evaporators (E1, E2) connected in parallel, each evaporator (E1, E2) has an electronic expansion valve (D1, D2) at its inlet, a solenoid valve (V1, V2) at its outlet; after the evaporators (E1, E2) are connected in parallel, outlets of the evaporators (E1, E2) are connected to an inlet of the compressor (1) and inlets of the evaporators (E1, E2) are connected to an outlet of the condenser (2); an outlet of the compressor (1) is connected to an inlet of the condenser (2); the compressor (1), the condenser (2) and the multiple parallel evaporators (E1, E2) form a closed loop system through pipelines; there are circulating refrigerants in the closed loop system, and heating and deicing processes are realized through a circulation of refrigerants; the solenoid valves (V1, V2) at the outlets of the evaporators (E1, E2) are
(Continued)

switched between opening or closing to realize switching between evaporating and deicing functions of the evaporators (E1, E2).

15 Claims, 4 Drawing Sheets

(51) Int. Cl.
  *F24H 4/02* (2022.01)
  *F25B 13/00* (2006.01)
  *F25B 30/02* (2006.01)
  *F25B 41/22* (2021.01)

(58) Field of Classification Search
  CPC ........ F25B 2313/004; F25B 2313/0251; F25B 2313/0253; F25B 2347/023; F25B 2500/09; F25B 2600/2519
  See application file for complete search history.

(56) References Cited

U.S. PATENT DOCUMENTS

| | | | | |
|---|---|---|---|---|
| 2005/0061487 | A1* | 3/2005 | Kroliczek | F28D 15/043 165/139 |
| 2007/0119196 | A1* | 5/2007 | Wellman | F25B 47/022 62/151 |
| 2008/0314062 | A1* | 12/2008 | Ritchey | F28B 11/00 62/119 |
| 2015/0345806 | A1* | 12/2015 | Hahn | F24D 11/0221 62/529 |
| 2016/0238269 | A1* | 8/2016 | Kwon | F24F 1/022 |
| 2019/0316793 | A1* | 10/2019 | Ho | C02F 9/005 |

FOREIGN PATENT DOCUMENTS

| | | |
|---|---|---|
| CN | 105135730 | 12/2015 |
| CN | 108518718 | 9/2018 |
| CN | 208124405 | 11/2018 |
| JP | 2010078193 | 4/2010 |
| KR | 101463122 | 11/2014 |

* cited by examiner

HEAT PUMP

CROSS-REFERENCE TO RELATED APPLICATION

This application is a 371 of international application of PCT application serial no. PCT/CN2018/124818, filed on Dec. 28, 2018, which claims the priority benefit of China application no. 201711469300.4, filed on Dec. 29, 2017. The entirety of each of the above mentioned patent applications is hereby incorporated by reference herein and made a part of this specification.

BACKGROUND

Technical Field

The invention relates to the technical field of heat pump heating. In particular, the invention relates to a device for heating by absorbing latent heat of solidification of water and a submersible latent heat pump with convenient use, high efficiency and energy saving.

Description of Related Art

Heat pump is an efficient, environmentally friendly and energy-saving heating device, and a water source heat pump is one of them. An existing water source heat pump technology mainly uses sensible heat of low temperature water as a low temperature heat source for heating. An operating range of the existing water source heat pump is usually from 10° C. to 30° C., and some manufacturers can reduce a minimum utilization temperature of the heat pump to 4° C. A minimum operating temperature of the heat pump is reduced, which is helpful to promote an application range of the heat pump. However, a large part of the energy in heat source water is still not used. In many places where surface water is not frozen, an application of a heat source of a water source is still limited.

When water changes from liquid to solid, it can release a lot of latent heat. Under a standard condition, when water solidifies into ice, a latent heat value per unit mass is 335 kJ/kg. Heat absorbed by the latent heat of solidification of 1 kg water is equivalent to heat released by 80 kg water falling 1° C. If the heat of solidification of water is used as a low temperature heat source of a heat pump system and high temperature hot water is produced, an application scope of the water source heat pump can be greatly expanded, and a problem of using heat pump heating in many places during winter can be solved.

The heat pump has a minimum temperature requirement to low temperature heat source water for two reasons. First, the temperature drops, and the heat pump efficiency decreases. Second, when a low temperature heat source water temperature is close to 0° C., the temperature may be less than 0° C. after the heat is absorbed by an evaporator, and a water side of the evaporator may freeze and cause damage to the heat pump. In conventional heating and refrigerating systems, an evaporating temperature must be higher than 0° C., and there is a safe temperature margin of 3~5° C. to ensure a safe and stable operation of an unit.

The biggest difficulty in absorbing the latent heat of solidification of water is that the latent heat released by water and a formed ice layer will be consolidated on a surface of the evaporator. The ice layer increases a heat resistance of the evaporator and reduces a heat exchange efficiency. The thicker the ice layer, the more the efficiency drops. To continuously and efficiently use the latent heat of water, it is necessary to adopt a convenient, reliable and efficient deicing method.

Commonly deicing methods are the use of heat to melt ice and deicing, which can usually be divided into the following types. Heating wires generates heat for deicing. A special hot gas bypass pipeline is provided between a compressor outlet and an evaporator inlet to pass high temperature hot gas at the compressor outlet into the evaporator to circulate for deicing. A four-way valve is used to reverse a direction of the heating cycle, and refrigerants condense and release heat in the evaporator to complete ice melting and deicing. There are disadvantages in adopting the above heat energy melting and deicing methods. When the electric heating ice melting method is adopted, an original heating cycle must be stopped and electrical energy needs to be input, so energy consumption is high and may cause overheating and fire. When the reversing of the hot gas bypass and the four-way valve are used for ice melting, a heat output of a condenser is interrupted, and it is also easy to cause the compressor to "liquid hammer".

The existing water source heat pump adopts methods of heat exchange on water, and all need to use a water pump to draw the low temperature heat source water into a heat exchanger of the unit to exchange heat, and then discharge return water to the heat source water after the heat exchange. Pump head must overcome resistance of the heat exchanger and a pipeline. The water pump of an open system must also overcome a static pressure generated by the height of the water source and the heat exchanger, which increases the power consumption of the water pump. In engineering practice, the heat source water mostly contains sediment, microorganisms, etc. With the sediment deposition and microorganism growth in water, a heat exchange capacity of the heat exchanger will continuously decline. These all increase system energy consumption and system maintenance workload, and reduce system operation stability.

SUMMARY

The invention provides a device for heating by absorbing latent heat of solidification of water. The invention also provides a heat pump for realizing the heating device, especially an efficient submersible heat pump which is simple to install and can be submerged inside a water source integrally to absorb the latent heat for heating to solve the above problems.

The device for heating by absorbing the latent heat of water includes a compressor, a condenser and multiple evaporators connected in parallel. Each evaporator has an electronic expansion valve at its inlet, and a solenoid valve at its outlet. After the evaporators are connected in parallel, outlets of the evaporators are connected to an inlet of the compressor and inlets of the evaporators are connected to an outlet of the condenser. An outlet of the compressor is connected to an inlet of the condenser. The compressor, the condenser and the multiple parallel evaporators are connected by pipelines to form a closed heat pump system. The heat pump system is filled with refrigerants, and the refrigerants are circulated in the compressor, the condenser and the evaporators to complete an absorption of the latent heat for heating. The solenoid valves at the outlets of the evaporators are opened or closed to realize switching between evaporation of the evaporators and deicing function. The multiple evaporators alternately perform the evaporation and the deicing, so that the evaporation and deicing processes in the heat pump system are performed simultaneously. The heat pump completes a continuous absorption of the latent heat for heating and the deicing processes.

Further, outer surfaces of the parallel evaporators directly exchange heat with water.

The invention also provides the heat pump for heating by absorbing the latent heat of solidification of water, including the aforementioned latent heat heating device. The multiple evaporators are joined to each other to form an outer surface of the heat pump, and the unit uses the outer surface to exchange heat with external water. The condenser inside the heat pump is provided with water outflow and inflow pipelines, and circulates with the external water to complete a heat output.

Further, multiple grooves are provided on a housing wall of an inner surface of the heat pump. Ultrasonic vibrators are arranged in the grooves, and the ultrasonic vibrators vibrate correspondingly according to various working modes of the heat pump.

Further, a four-way valve is connected to the inlet and the outlet of the compressor, and the heat pump can realize a refrigerating function by switching the four-way valve.

Further, electric heating elements are provided on the housing wall of the inner surface of the evaporators of the heat pump. The electric heating elements, the four-way valve and the inlet and outlet valves of the evaporators can be used to adjust the amount of refrigerants in each heat exchanger to achieve the refrigerating under multiple operating conditions.

Further, a heat-insulating material is filled between the condenser and inner walls of the evaporators.

Compared with the prior art, the methods of the present invention have the following beneficial effects.

(1) The device of the invention utilizes a function of the latent heat for heating, so that the latent heat of water can be efficiently and conveniently used as a low temperature heat source of the heat pump. Another ideal low temperature heat source is found for the heat pump, which can greatly promote the promotion and application of heat pump technology in heating and heat supply.

(2) The heat pump of the invention absorbs the latent heat for heating, which greatly reduces a temperature limit of a water source heat pump system to low temperature heat source water. This functional feature of the heat pump greatly widens the application area of the heat pump in heating and heat supply. In areas where water source is abundant and not frozen, the heat pump of the invention can be used for heating and heat supply simply and conveniently.

(3) The heat pump works by submerging in water source integrally, which reduces a low temperature side heat source water system of the water source heat pump system, simplifies the system, and saves installation space. Its simple system and concealed layout are especially suitable for heating and air conditioning in villas and rural buildings. This type of building is small in volume and has many open spaces beside the building. Multiple underground heat source wells can be built in the open space area, and the heat pump of the present invention is installed in the heat source well. When heating or heat is needed, the heat pump heats, extracts heat from water and stores cold in the heat source well, the minimum temperature of the heat source well can reach 0° C. When cold is needed, the heat pump refrigerates, releases heat to the heat source well and extracts the cold stored in the heat source well. This not only meets the needs of refrigerating and heating, but also can use the balance of heating and refrigerating to save heating and refrigerating costs.

(4) The heat pump adopts the method of direct heat exchange between the surface and water to prevent suspended matter and impurities from entering the unit, avoiding the possibility of foreign objects blocking or adhering to the surface of the heat exchanger, etc., which improves the reliability of heat pump operation.

(5) The heat pump system of the present invention can simplify a chilled water storage system. In an application place requiring a water storage system, it is only necessary to build a heat preservation pool matching the capacity, and the heat pump of the present invention is submersed and installed in the heat preservation pool. When cold storage is required, the heat pump operates in a heating mode, and heat exchange circulating water of an internal heat exchanger serves as cooling water to make chilled water in the heat preservation pool. The minimum temperature of refrigerating can reach 0° C. When cold is required, the heat pump operates in a low temperature refrigerating mode, and the heat exchange circulating water of the internal heat exchanger serves as refrigerant water, providing a cold source for the outside world.

DESCRIPTION OF THE EMBODIMENTS

Figure 1:
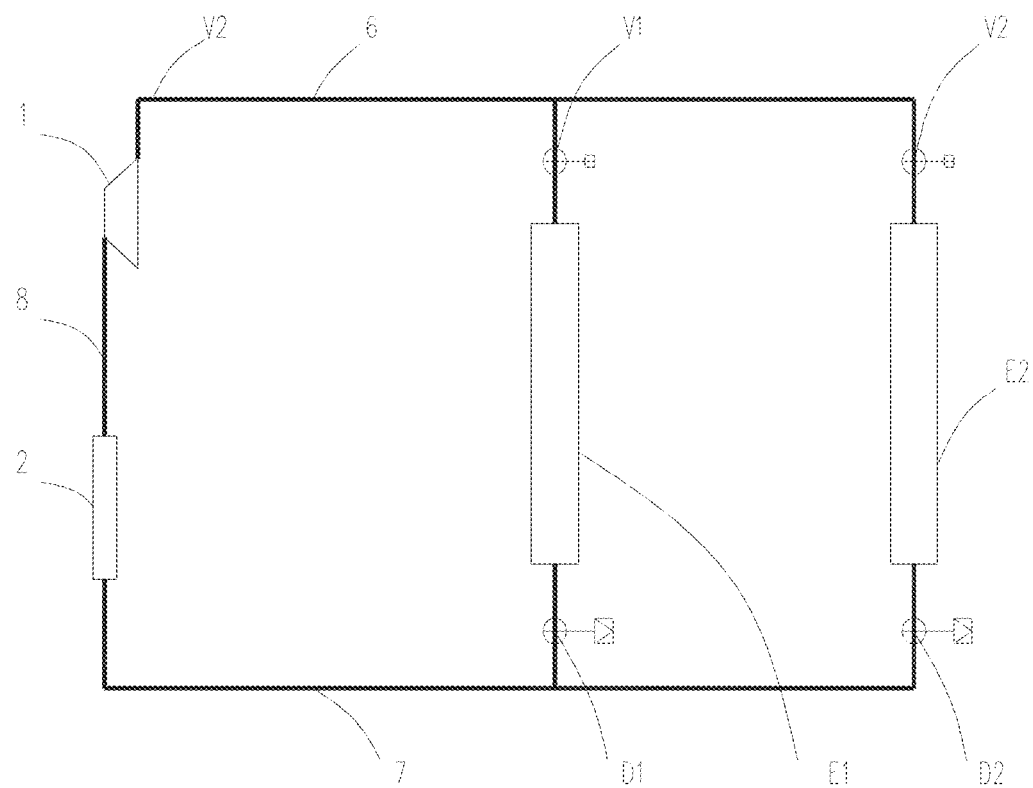
FIG. 1 is a schematic diagram of a device for continuous heating by absorbing latent heat of solidification of water.

The present invention will be further described below with reference to specific examples. The drawings are only for illustrative purposes, and represent only schematic diagrams, rather than physical pictures, and cannot be understood as a limitation of this application. In order to better illustrate the examples of the present invention, some parts in the drawings may be omitted, enlarged or reduced, and do not represent the actual product size. It is understandable to those skilled in the art that some well-known structures and their descriptions in the drawings may be omitted.

Embodiment 1

As shown in FIG. 1, a device for continuous heating by absorbing latent heat of solidification of water is provided, which includes two evaporators E1 and E2 that are in direct contact heat exchange with a water source. Solenoid valves V1 and V2 are separately provided at outlets of the evaporators E1 and E2, and electronic expansion valves D1 and D2 are separately provided at inlets. The device also includes a compressor 1 and a condenser 2. The compressor 1 compresses and pressurizes refrigerants, and the condenser 2 performs condensation and heat exchange to the refrigerants. Pipelines following the solenoid valves V1 and V2 at the outlets of the evaporators E1 and E2 are connected in parallel and connected to an inlet of the compressor 1 through a main pipeline 6. Pipelines in front of the electronic expansion valves D1 and D2 at the inlets of the evaporators E1 and E2 are connected in parallel, and are connected to an outlet of the condenser 2 through a main pipeline 7. An outlet of the compressor 1 is connected to an inlet of the condenser 2 through a pipeline 8.

The compressor 1 is a heat pump type compressor to meet requirements for a stable operation of a heat pump in a wide temperature range and a large differential pressure range.

The evaporators E1 and E2 of the heating device are in direct contact with water to exchange heat, and the refrigerants evaporate in the evaporators at a temperature lower than 0° C. When an ice layer on a surface of the evaporator E1 reaches a certain thickness and deicing is required, the solenoid valve V1 at the outlet of the evaporator E1 is closed. Under the action of the compressor and after being condensed from the condenser 2, the refrigerants enter the evaporator E1 and the evaporator E2 through the respective electronic expansion valves D1 and D2. The outlet V1 of the evaporator E1 is closed, the refrigerants accumulate in the evaporator E1, and a pressure and a temperature rise. When the temperature exceeds 0° C., the refrigerants in the evaporator E1 release heat to the outside again, and the ice layer consolidated on its surface will partially melt. Under the action of buoyancy of water, unmelted ice layer floats away from an outer surface of the evaporator, and the evaporator E1 completes the work of melting the ice layer. While deicing of E1 is in progress, the evaporator E2 remains in an evaporated state.

When an ice layer on the outer surface of the evaporator E2 reaches a certain thickness, the solenoid valve V2 of the outlet of the evaporator E2 is closed, and the evaporator E2 enters a state of melting and deicing. At the same time, the valve V1 of the outlet of the evaporator E1 that has completed the deicing is opened, and the evaporator E1 enters an evaporation state again.

With such alternation, one evaporator is always kept in the evaporation state of evaporating and absorbing the latent heat during a heating cycle, and the condenser of the heat pump can achieve a continuous heat output. The heat pump completes an absorption of the latent heat of solidification of water for heating.

Specifically, the complete latent heat absorption and all parts of the uninterrupted heating device complete the following processes.

Process 1, evaporating and absorbing heat:

The liquid refrigerants that have released heat in the condenser 2 enter the evaporators through the pipeline 7 and the electronic expansion valves. When the outlet valves of the evaporators are open; under the suction of the compressor, the refrigerants in the evaporators evaporate at a temperature below 0° C., the latent heat of solidification of water is absorbed. After the latent heat of solidification is released by water, the ice layers are consolidated on the surfaces of the evaporators, and the refrigerants evaporate to form low temperature and low pressure gas refrigerants, which enter the compressor 1 through the pipeline 6.

Process 2, compressing and pressure boosting:

After the refrigerants enter the compressor 1 through the pipeline 6, the refrigerants are compressed by the compressor 1, the pressure of the refrigerants increases, the temperature increases, and the refrigerants enter the condenser 2 through the pipeline 8.

Process 3, condensing and releasing heat:

High temperature and high pressure gas refrigerants formed after passing through the compressor 1 enter the condenser 2 through the pipeline 8 to release high temperature heat, and the high temperature heat released in the condenser 2 can output heat through a circulating hot water pipeline. The refrigerants condense and release heat under high pressure to form saturated liquid refrigerants.

Process 4, low temperature releasing heat and deicing:

The liquid refrigerants after releasing heat in the condenser enters the evaporators through the pipeline 7 and the electronic expansion valves. When the outlet valves of the evaporators are closed. The refrigerants accumulates in the evaporators and the pressure and temperature rise. When the temperature exceeds 0° C., the refrigerants release heat to the outside. The ice layers consolidated on the surfaces of the evaporators melt at interfaces. When complete water films are formed at the entire interfaces, the ice layers that have not yet melted are removed from the surfaces under the action of buoyancy of water, and the evaporators complete deicing.

In the above four processes, process 1 and process 4 are alternately performed in two parallel external surface evaporators E1 and E2, and process 2 and process 3 are continuously performed in the compressor 1 and the condenser 2 respectively. The condenser 2 can continuously release high temperature heat.

The electronic expansion valves D1 and D2 at the inlets of the evaporative heat exchangers E1 and E2 perform throttling and refrigerants flow control to keep one of the two evaporative heat exchangers E1 and E2 of the heating cycle in the evaporation state that absorbs the latent heat, which can keep the condensing heat exchanger 2 constantly releasing heat. The heating device realizes the function of absorbing the latent heat in water and continuously releasing heat.

Embodiment 2

Figure 2:
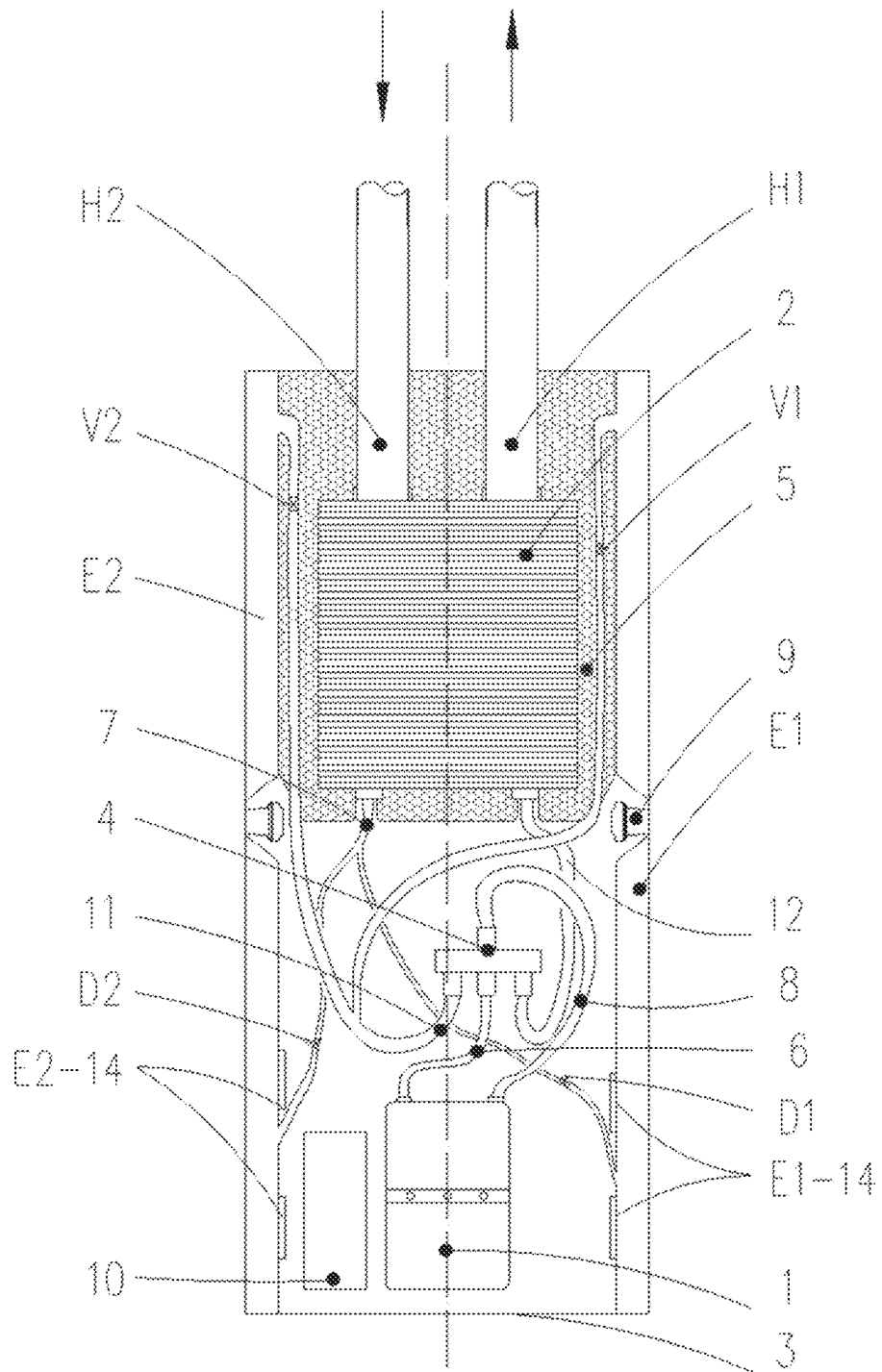
FIG. 2 is a schematic diagram of a heat pump.

As shown in FIG. 2, a heat pump is provided. The unit includes the heating device in Embodiment 1, and specifically includes a compressor 1, a condenser 2, a four-way valve 4, an evaporator E1, an evaporator E2, an ultrasonic vibrator 9 installed on an inner layer of the heat pump, and a water outlet H1 and a water inlet H2 connected to the condenser 2.

The two parallel evaporators E1 and E2 form a housing 3 of the heat pump unit. When the unit is submerged for operation, surfaces of the housing 3 are used as heat exchange surfaces to exchange heat with water.

Figure 3:
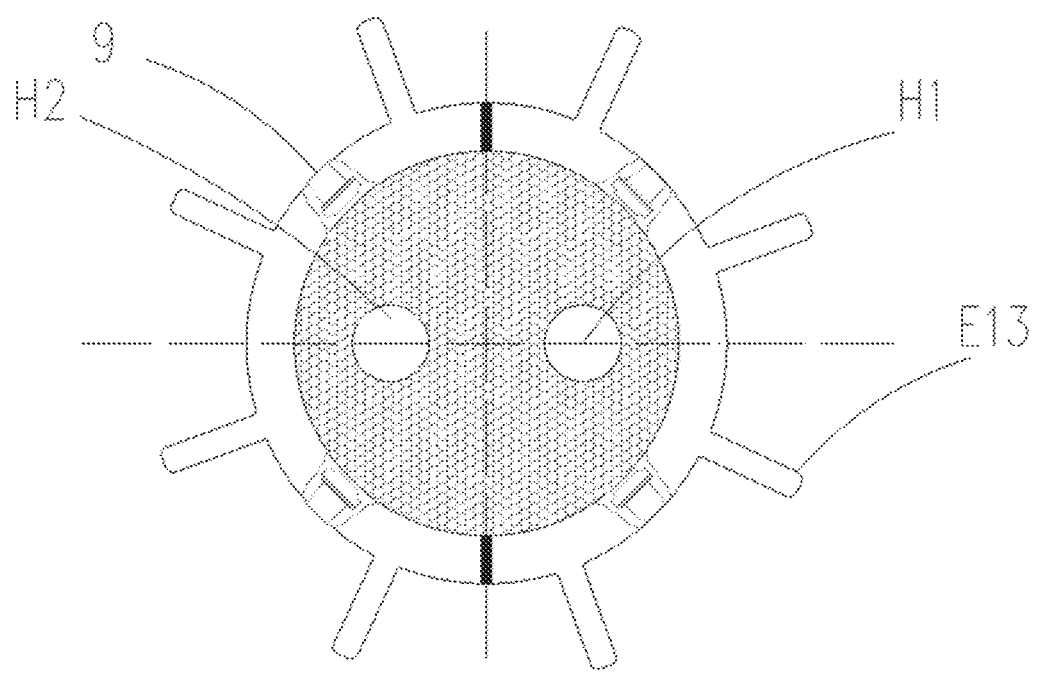
FIG. 3 is a top view of a heat pump.

In order to increase contact surfaces and the heat exchange surfaces between the evaporators and water, as shown in FIG. 3, reinforcing protrusions E13 are provided on the surfaces of the evaporators to increase surface areas and strength of the evaporators.

An outlet pipeline 8 and an inlet pipeline 6 of the compressor 1, an inlet pipeline 12 of the condenser 2, the evaporator E1, and an outlet pipeline 11 of the evaporator E2 are connected by the four-way valve 4. An outlet of the condenser 2 is connected to inlets of the evaporators E1 and E2 through a pipeline 7. When the heat pump is heating, the four-way valve connects the pipeline 8 to the pipeline 12 and the pipeline 6 to the pipeline 11.

Specifically, the inlet of the evaporator E1 has an electronic expansion valve D1, and an outlet has a solenoid valve V1. The inlet of the evaporator E2 has an electronic expansion valve D2, and an outlet has a solenoid valve V2. When the heat pump is working, it submerges into water source integrally, which is conducive to improving efficiency of the heat pump and controlling noise of the heat pump.

Cavities between a circulating water outlet pipeline H1, a circulating water inlet pipeline H2 and the evaporators are filled with rubber-plastic heat-insulating material 5 to reduce a heat loss of internal heat transfer. The heat-insulating material is made of polyurethane foam, rubber-plastic sponge, etc., preferably rubber-plastic heat-insulating material. The rubber-plastic heat-insulating material is an elastic closed-cell elastic material, which is soft, bend-resistant, cold-resistant, heat-resistant, flame-retardant, low thermal conductivity, shock absorption, sound absorption and other excellent performance, can achieve the effect of reducing cold and heat loss.

Outer walls of inner sides of the evaporator E1 and evaporator E2 are also provided with electric heating elements E1-14 and E2-14. The electric heating elements E1-14 and E2-14 are directly attached to outer surfaces of the inner side of the evaporator E1 and the evaporator E2. The heat generated by the electric heating elements can be directly absorbed by the evaporator E1 and the evaporator E2.

When the heat pump operates in an environment where a temperature of external water is close to 0° C. (below 5° C.), the heat pump absorbs the latent heat for heating. When absorbing the latent heat for heating, the solenoid valves V1 and V2 at the outlets of the evaporator E1 and the evaporator E2 are switched between deicing and evaporation states. A refrigerant path is divided into two parts. Path A: refrigerants pass through the compressor 1→the condenser 2→the electronic expansion valve D1→the evaporator E1→the solenoid valve V1→the compressor 1, and a process of compressing→condensing→throttling→evaporating→compressing is completed correspondingly, and a compressing and heating cycle is completed. The latent heat of solidification of the surface of the evaporator E1 contacting water is absorbed, and water solidifies and freezes into an ice layer on the surface of the evaporator E1 after releasing heat. Path B: the refrigerants pass through the compressor 1→the condenser 2→the electronic expansion valve D2→the evaporator E2, and a process of compressing→condensing→throttling→low temperature releasing heat and deicing is completed, when a temperature of the evaporator E2 in this path exceeds 0° C. due to refrigerants accumulation, the evaporator E2 releases heat to outside, the ice layer consolidated on the contact surface of the evaporator E2 melts, and the ice layer floats up under the action of water, leaves the surface of the evaporator E2, and the heat exchanger completes the deicing. Through a switching of the outlet valves V1 and V2 of the evaporator E1 and the evaporator E2, one of the evaporator E1 and the evaporator E2 is always in the evaporation state, which can ensure that the heat pump continuously absorbs the latent heat for heating and completes a heat output.

When a temperature of an external water source is much higher than 0° C. (usually higher than 5° C.), the heat pump can operate in a mode of absorbing sensible heat. Specifically, the solenoid valves at the outlets of the evaporators E1 and E2 are fully opened, and opening degrees of the electronic expansion valves at the inlets remain the same. A refrigerant path is the compressor 1→the condenser 2→the electronic expansion valves D1 and D2→the evaporator E1 and E2→the compressor 1, and the process of compressing→condensing→throttling→evaporating→compressing is completed correspondingly. The heat pump continuously outputs heat.

By switching the four-way valve 4, the heat pump can realize a refrigerating function. When the heat pump is refrigerating, the four-way valve connects the pipeline 8 with the pipeline 11 and the pipeline 6 with the pipeline 12.

During heat pump refrigerating operation, the functions of the condenser and the evaporator are interchanged, the condenser 2 serves as the evaporator of a refrigerating system, and the evaporators E1 and E2 serve as the condenser of the refrigerating system. The solenoid valves V1 and V2 that serve as the inlets of the condensers E1 and E2 are fully opened, and the opening degrees of the outlet electronic expansion valves D1 and D2 remain the same. The refrigerant path is the compressor 1→the condenser E1 and E2→the electronic expansion valve D1 and D2→the evaporator 2→the compressor 1, the process of compressing→condensing→throttling→evaporating→compressing is completed correspondingly, and a compressing and refrigerating cycle is completed. Circulating water of the evaporator 2 provides chilled water to the outside.

When the heat pump is in a refrigerating operation, the external water source is equivalent to cooling water of the refrigerating system. The lower the cooling water temperature, the higher the refrigerating efficiency. However, when the temperature of the outside water is too low and below the temperature of the chilled water, the refrigerants will excessively condense and accumulate in E1 and E2 as the condensers, and the refrigerating cycle will be broken. At this time, the heat pump can operate in a low temperature condensation mode. In this mode, adjusting the heat exchange area of the condenser in the refrigerating cycle and adjusting the amount of circulating refrigerants allow the refrigerating cycle to continue. Specifically, the four-way valve 4 is switched to the inlet 6 of the compressor 1 is connected to the pipeline 11 and the outlet pipeline 8 is connected to the pipeline 12, and at the same time, the electronic expansion valve D1 of the heat exchanger E1 is closed and the solenoid valve V2 of the heat exchanger E2 is closed, the electric heating elements E1-14 on an inner surface of the heat exchanger E1 and the compressor 1 are turned on. The suction effect of the compressor 1 allows the refrigerants to enter the condenser 2 and the heat exchanger E2. When the pressure in the evaporator E1 reaches a set value, the electronic expansion valve D1 and the solenoid valve V1 of the heat exchanger E1 are closed, the four-way valve 4 is switched to the inlet 6 of the compressor 1 is connected to the pipeline 12, and the outlet pipeline 8 is connected to the pipeline 11. In the refrigerating system, only the heat exchanger E2 is reserved as the condenser in the refrigerating system. The refrigerant path is the compressor 1→the condenser E2→the electronic expansion valve D2→the evaporator 2→the compressor 1, the process of compressing→condensing→throttling→evaporating→compressing is completed correspondingly. At this time, the heat exchange area of the condenser in the refrigerating system decreases, the refrigerants increases, and the refrigerating cycle can continue.

Figure 4:
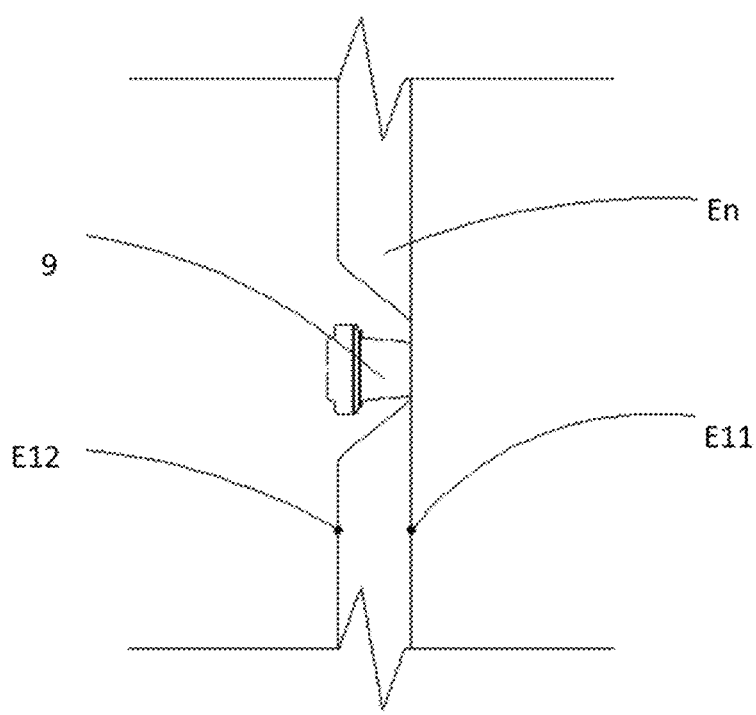
FIG. 4 is a partial schematic diagram of a heat pump.

As shown in FIG. 4, inner surfaces of housings of the heat exchangers E1 and E2 are processed with grooves, and the inner and outer walls of the grooves are bonded together to enhance the strength of the heat exchangers. Ultrasonic vibrators 9 are installed in the formed grooves, and an ultrasonic vibration generating device 10 is provided inside the heat pump. In accordance with the different operation modes of the heat pump unit, the ultrasonic vibration generating device 10 sends out ultrasonic waves through the ultrasonic vibrators 9 to realize different functions.

When the heat pump absorbs the latent heat for heating operation, the ultrasonic waves vibrate in different areas. Specifically, the ultrasonic vibrators on the evaporators are vibrated where the deicing is operated. Ultrasonic vibration can accelerate the ice layer off the surface of the heat exchanger, thus ensuring the stable operation of the heat pump.

When the heat pump absorbs sensible heat for heating operation, the ultrasonic waves vibrate intermittently in different periods. The use of ultrasonic intermittent vibration can ensure the cleanness of the outer surface of the heat pump, thereby ensuring the heat exchange efficiency and stable operation of the heat pump.

When the heat pump is operated in a conventional refrigerating mode, the ultrasonic waves vibrate intermittently in different periods. Use cavitation and vibration effects of the ultrasonic waves to speed up the transfer of heat released by the heat pump in water. At the same time, the ultrasonic vibration can keep the outer surface of the heat pump clean, prevent the formation of scale deposits on the outer surface of the heat exchanger caused by the high temperature of the outer surface, and ensure the heat pump efficiency and stable operation.

When the heat pump is operated in a low temperature condensation mode. Ultrasonic does not work. Avoid heat spreading too fast to avoid unstable heat pump operation.

Obviously, the above embodiments are only examples for clearly explaining the technical solutions of the present invention, rather than limiting the embodiments of the present invention. This application details the deicing and evaporation of the two evaporators in turn, but the deicing and evaporation of multiple evaporators are similar. For those of ordinary skill in the art, other different forms of changes or changes can be made based on the above description. There is no need to exhaustively list all implementations. Any amendments, equivalent replacement and improvement made within the spirit and principle of the present invention shall be included in the protection scope of the claims of the present invention.

What is claimed is:

1. A heat pump comprising a device for heating by absorbing latent heat of solidification of water, the device comprising a compressor, a condenser and evaporators connected in parallel, wherein the evaporators respectively have inlets and outlets, each of the evaporators has an electronic expansion valve at the corresponding inlet and a solenoid valve at the corresponding outlet;

after the evaporators are connected in parallel, the outlets of the evaporators are connected to an inlet of the compressor and the inlets of the evaporators are connected to an outlet of the condenser; an outlet of the compressor is connected to an inlet of the condenser; the compressor, the condenser and the evaporators form a closed loop system through pipelines;

there are circulating refrigerants in the closed loop system, and heating and deicing processes are realized through a circulation of the refrigerants;

the solenoid valve at the outlet of each of the evaporators is switched between opening or closing to realize switching between evaporating and deicing functions of each of the evaporators, wherein the heat pump comprises a housing, the evaporators are joined to each other to form an outer surface of the heat pump, and the heat pump uses the outer surface to exchange heat with external water; the outer surface is integrated with the housing of the heat pump to wrap the heat pump; the condenser inside the heat pump is provided with water outflow and inflow pipelines to circulate with an external water flow.

2. The heat pump according to claim 1, wherein the inlets and outlets of the evaporators connected in parallel are each connected to main pipelines, one of the main pipelines at the outlets is connected to the compressor, and another one of the main pipelines at the inlets is connected to the condenser.

3. The heat pump according to claim 2, wherein outer surfaces of the evaporators connected in parallel directly exchange heat with water.

4. The heat pump according to claim 1, wherein multiple grooves are provided on a housing wall of an inner surface of the heat pump, the evaporators and the housing are tightly attached to each other at the grooves, and ultrasonic vibrators are provided inside the grooves, and the ultrasonic vibrators vibrate correspondingly according to various working modes of the heat pump.

5. The heat pump according to claim 4, wherein a four-way valve is connected to the inlet and the outlet of the compressor, and the heat pump is adapted to realize a refrigerating function under multiple operating conditions by switching the four-way valve.

6. The heat pump according to claim 5, wherein electric heating elements are provided on the housing wall of the inner surface of the evaporators, the amount of refrigerants in each external heat exchanger is adapted to be adjusted by a cooperation of the electric heating elements and the four-way valve.

7. The heat pump according to claim 1, wherein a heat-insulating material is filled between the condenser and inner walls of the evaporators.

8. The heat pump according to claim 2, wherein multiple grooves are provided on a housing wall of an inner surface of the heat pump, the evaporators and the housing are tightly attached to each other at the grooves, and ultrasonic vibrators are provided inside the grooves, and the ultrasonic vibrators vibrate correspondingly according to various working modes of the heat pump.

9. The heat pump according to claim 8, wherein a four-way valve is connected to the inlet and the outlet of the compressor, and the heat pump is adapted to realize a refrigerating function under multiple operating conditions by switching the four-way valve.

10. The heat pump according to claim 9, wherein electric heating elements are provided on the housing wall of the inner surface of the evaporators, the amount of refrigerants in each external heat exchanger is adapted to be adjusted by a cooperation of the electric heating elements and the four-way valve.

11. The heat pump according to claim 2, wherein a heat-insulating material is filled between the condenser and inner walls of the evaporators.

12. The heat pump according to claim 3, wherein multiple grooves are provided on a housing wall of an inner surface of the heat pump, the evaporators and the housing are tightly attached to each other at the grooves, and ultrasonic vibrators are provided inside the grooves, and the ultrasonic vibrators vibrate correspondingly according to various working modes of the heat pump.

13. The heat pump according to claim 12, wherein a four-way valve is connected to the inlet and the outlet of the compressor, and the heat pump is adapted to realize a refrigerating function under multiple operating conditions by switching the four-way valve.

14. The heat pump according to claim 13, wherein electric heating elements are provided on the housing wall of the inner surface of the evaporators, the amount of refrigerants in each external heat exchanger is adapted to be adjusted by a cooperation of the electric heating elements and the four-way valve.

15. The heat pump according to claim 3, wherein a heat-insulating material is filled between the condenser and inner walls of the evaporators.

* * * * *